United States Patent
Gangadharan et al.

(10) Patent No.: US 9,178,904 B1
(45) Date of Patent: Nov. 3, 2015

(54) SYSTEMS AND METHODS FOR DETECTING MALICIOUS BROWSER-BASED SCRIPTS

(71) Applicant: Symantec Corporation, Mountain View, CA (US)

(72) Inventors: Haridharan Nattamai Gangadharan, Chennai (IN); Jim Casaburi, Rancho Palos Verdes, CA (US)

(73) Assignee: Symantec Corporation, Mountain View, CA (US)

( * ) Notice: Subject to any disclaimer, the term of this patent is extended or adjusted under 35 U.S.C. 154(b) by 132 days.

(21) Appl. No.: 14/024,604

(22) Filed: Sep. 11, 2013

(51) Int. Cl.
*G06F 17/00* (2006.01)
*H04L 29/06* (2006.01)

(52) U.S. Cl.
CPC ............ *H04L 63/1441* (2013.01); *H04L 63/20* (2013.01)

(58) Field of Classification Search
CPC ..... G06F 21/629; G06F 21/121; G06F 21/52; H04L 63/10; H04L 63/1466; H04L 63/168; H04L 63/20; H04L 63/1441; G06Q 10/01
USPC ............................................................ 726/1
See application file for complete search history.

(56) References Cited

U.S. PATENT DOCUMENTS

2013/0198612 A1* 8/2013 Ceze et al. .................... 715/235
2014/0130161 A1* 5/2014 Golovanov .................... 726/23

OTHER PUBLICATIONS

Acunetix; Better DOM-based XSS Vulnerabilities Detection; http://www.acunetix.com/blog/web-security-zone/articles/dom-xss/; as accessed on Jun. 29, 2013.
Wikipedia; Cross-Site Scripting; http://en.wikipedia.org/wiki/Cross-site_scripting; as accessed on Jun. 29, 2013.
Wikipedia; JavaScript; http://en.wikipedia.org/wiki/JavaScript; as accessed on Jun. 29, 2013.
Shreeraj Shah; Vulnerability Scanning Web 2.0 Client-Site Components; Symantec Connect Community; http://www.symantec.com/connect/articles/vulnerability-scanning-web-20-client-side-components; Nov. 27, 2006.
Bitdefender; Bitdefender Toolbox—Your Essential Free Antivirus Tools; http://www.bitdefender.com/freetools/; as accessed on Jun. 29, 2013.
Bitdefender; Bitdefender QuickScan Fast & Free Online Virus Scanner; http://quickscan.bitdefender.com/about/; as accessed on Jun. 29, 2013.

* cited by examiner

*Primary Examiner* — Dant Shaifer Harriman
*Assistant Examiner* — Abiy Getachew
(74) *Attorney, Agent, or Firm* — ALG Intellectual Property, LLC

(57) ABSTRACT

A computer-implemented method for detecting malicious browser-based scripts may include (1) identifying an attempt by a web browser to access sensitive information stored on a server, (2) identifying a web browser script installed in the web browser, (3) calculating a signature hash for the web browser script, (4) querying, using the signature hash, a browser script signature database that associates web browser script signature hashes with script security indicators, (5) receiving, in response to querying the browser script signature database, a script security indicator associated with the signature hash, and (6) applying, based on the script security indicator associated with the web browser script, a script security policy associated with the web browser script. Various other methods, systems, and computer-readable media are also disclosed.

20 Claims, 6 Drawing Sheets

SYSTEMS AND METHODS FOR DETECTING MALICIOUS BROWSER-BASED SCRIPTS

BACKGROUND

When a web server provides sensitive information to a client device, there is a risk that this sensitive information may be intercepted by malicious scripts installed on the client device as web browser extensions. Even when secure communications protocols are used, if a malicious script manages to become installed within a client device's browser, this malicious script may scan or gain access to sensitive content delivered to the client device's browser.

One approach to dealing with this issue has been to move, via dynamic virtualization of a client device's script interpreter, the processing of secure interactions to the web-server side. Unfortunately, this approach may limit the functionality of the client device's browser when compared with direct execution of scripts on the client device. Additionally, the network communication involved and execution of the virtual browser environment may create bandwidth and processor burdens for the web server.

In view of the above limitations, the instant disclosure identifies a need for additional and improved systems and methods for dealing with malicious browser-based scripts.

SUMMARY

As will be described in greater detail below, the instant disclosure generally relates to systems and methods for detecting malicious browser-based scripts by comparing web browser scripts installed on a client device with scripts known to be safe before allowing the client device's browser to access sensitive information. In one example, a computer-implemented method for performing such a task may include (1) identifying an attempt by a web browser to access sensitive information stored on a server, (2) identifying a web browser script installed in the web browser, (3) calculating a signature hash for the web browser script, (4) querying, using the signature hash, a browser script signature database that associates web browser script signature hashes with script security indicators, (5) receiving, in response to querying the browser script signature database, a script security indicator associated with the signature hash, and (6) applying, based on the script security indicator associated with the web browser script, a script security policy associated with the web browser script.

In some examples, identifying the attempt by the web browser to access the sensitive information stored on the server may include (1) detecting that the web browser is obtaining web data using hypertext transport protocol secure, (2) detecting that a web page contains a request for security credentials, and/or (3) receiving, from the server, an indication that the web browser is attempting to access sensitive information.

In other examples, identifying the web browser script installed in the web browser may include (1) locating the web browser script by inspecting Document Object Model nodes in the web browser, (2) locating the web browser script by inspecting JAVASCRIPT segments in the web browser, and/or (3) identifying the web browser script when the web browser script is installed in the web browser.

In some examples, the computer-implemented method may further include obtaining the script security policy by (1) reading the script security policy from a configuration file, (2) obtaining the script security policy from the browser script signature database, (3) obtaining the script security policy from a local network security policy, and/or (4) receiving, via a user interface, a user-generated selection of the script security policy.

In other examples, applying the script security policy may include (1) displaying a message informing the user of the script security policy, (2) permitting the web browser to access the sensitive information stored on the server, (3) blocking access by the web browser to the sensitive information stored on the server, (4) blocking network access by the computing device, and/or (5) disabling the web browser script.

In other examples, the computer-implemented method may further include maintaining the browser script signature database. In these examples, maintaining the browser script signature database may include (1) installing the web browser script, (2) calculating the signature hash for the web browser script, and (3) adding the signature hash to the browser script signature database. Maintaining the browser script signature database may also include (1) deploying a software agent that locates, downloads, and installs the web browser script, (2) calculating the signature hash for the web browser script, and (3) adding the signature hash to the browser script signature database. In addition, maintaining the browser script signature database may include (1) providing a monitoring module to web browsers that identifies the web browser script, (2) receiving, from the monitoring module, the signature hash for the web browser script, and (3) adding the signature hash to the browser script signature database.

In one embodiment, a system for implementing the above-described method may include (1) an identification module identifies a web browser script installed in the web browser, (2) a calculation module that calculates a signature hash for the web browser script, (3) a querying module that queries, using the signature hash, a browser script signature database that associates web browser script signature hashes with script security indicators, (4) a receiving module that receives, in response to querying the browser script signature database, a script security indicator associated with the signature hash, (5) an applying module that applies, based on the script security indicator associated with the web browser script, a script security policy associated with the web browser script, and (6) at least one processor configured to execute the identification module, the calculation module, the querying module, the receiving module, and the applying module.

In another embodiment, the above-described method may be encoded as computer-readable instructions on a non-transitory computer-readable-storage medium. For example, a computer-readable-storage medium may include one or more computer-executable instructions that, when executed by at least one processor of a computing device, may cause the computing device to (1) identify an attempt by a web browser to access sensitive information stored on a server, (2) identify a web browser script installed in the web browser, (3) calculate a signature hash for the web browser script, (4) query, using the signature hash, a browser script signature database that associates web browser script signature hashes with script security indicators, (5) receive, in response to querying the browser script signature database, a script security indicator associated with the signature hash, and (6) apply, based on the script security indicator associated with the web browser script, a script security policy associated with the web browser script.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
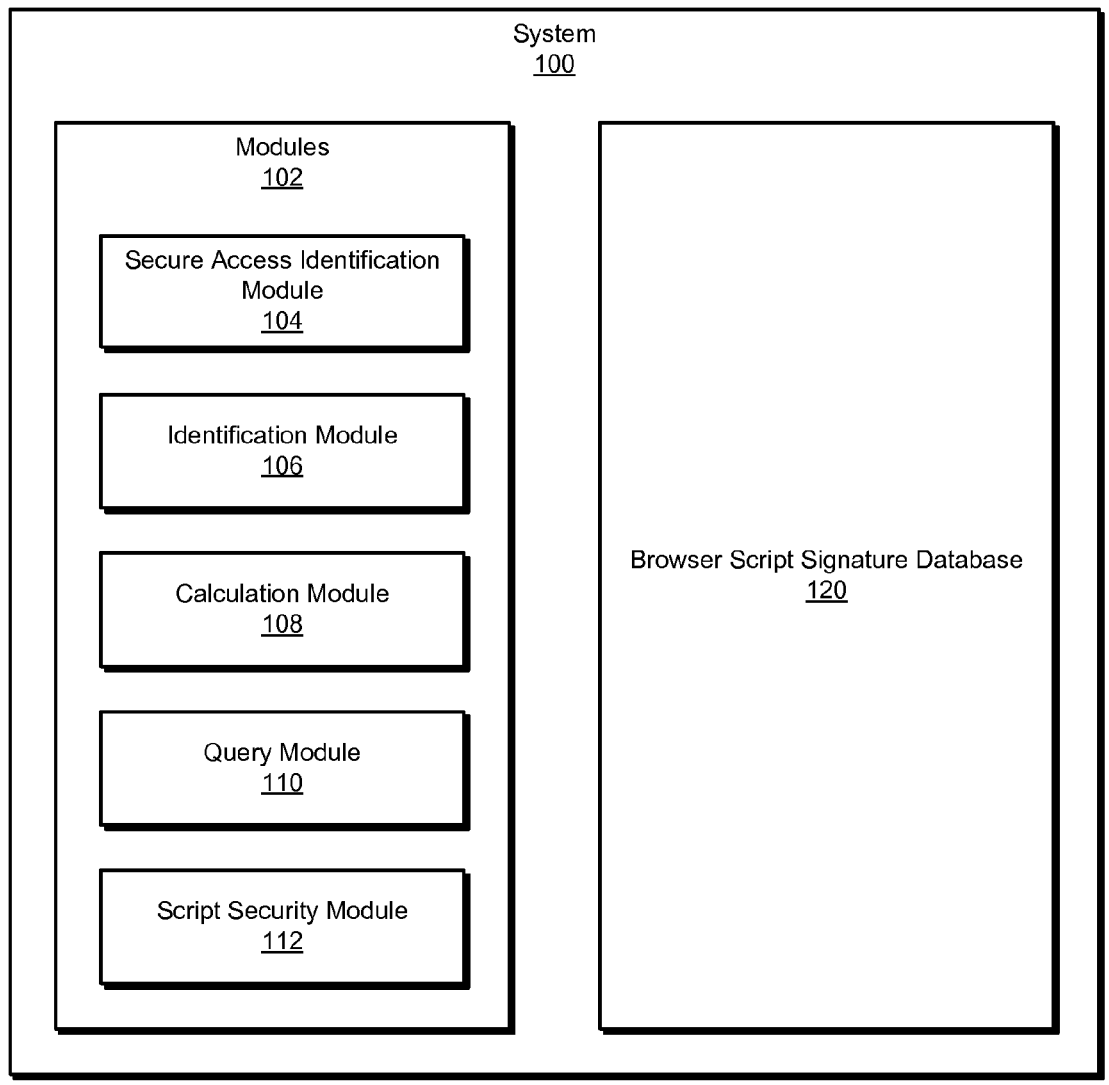
FIG. 1 is a block diagram of an exemplary system for detecting malicious browser-based scripts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malicious browser-based scripts. As will be explained in greater detail below, by verifying the safety of installed browser scripts prior to transmitting sensitive information to a client device, the security of this sensitive information may be protected. In addition, by offloading the majority of the processing required to perform this verification to the client device, the systems and methods described herein may avoid imposing additional processing or network bandwidth demands on the web server that hosts this sensitive information.

Figure 2:
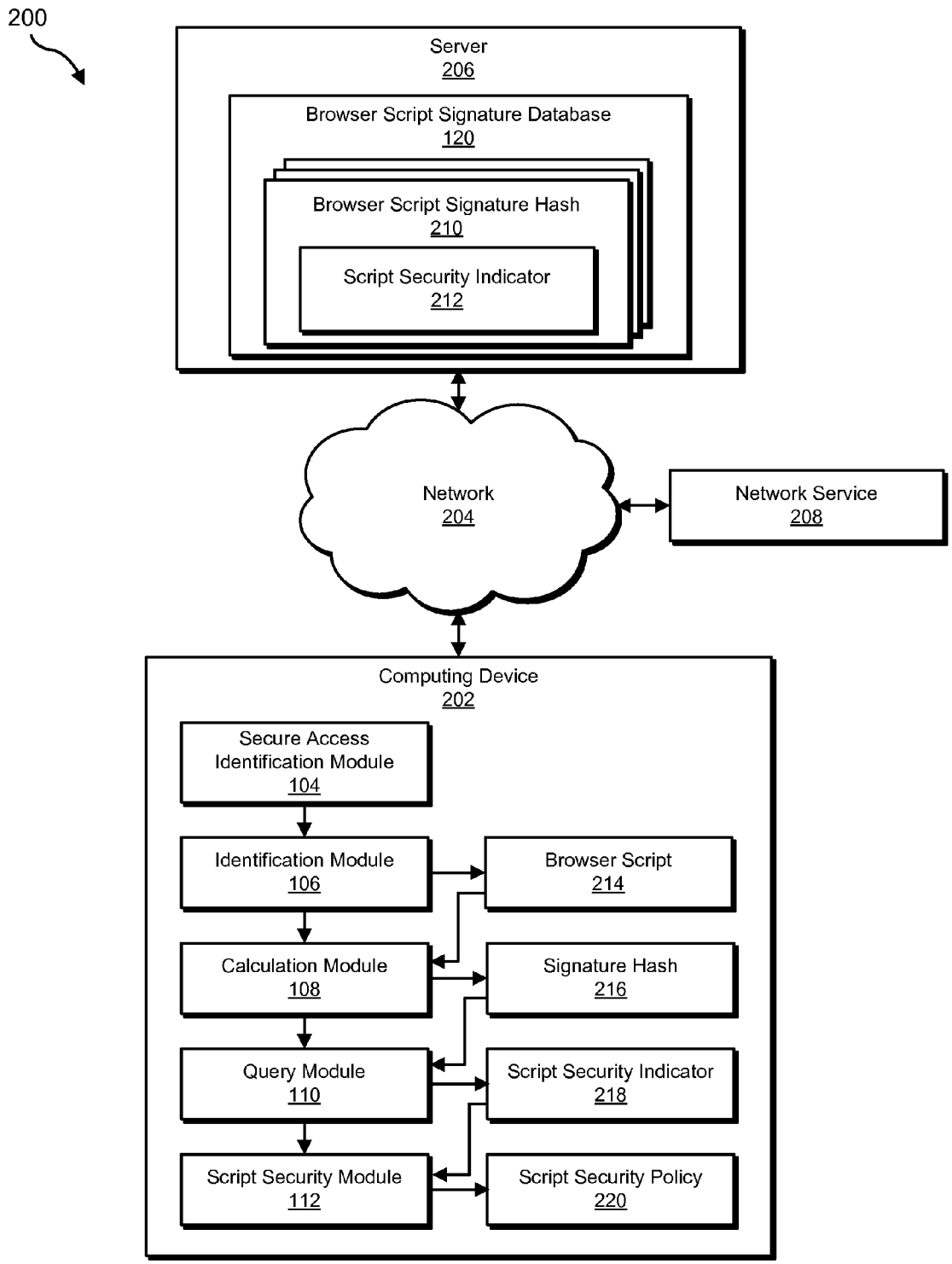
FIG. 2 is a block diagram of an additional exemplary system for detecting malicious browser-based scripts.
Figure 3:
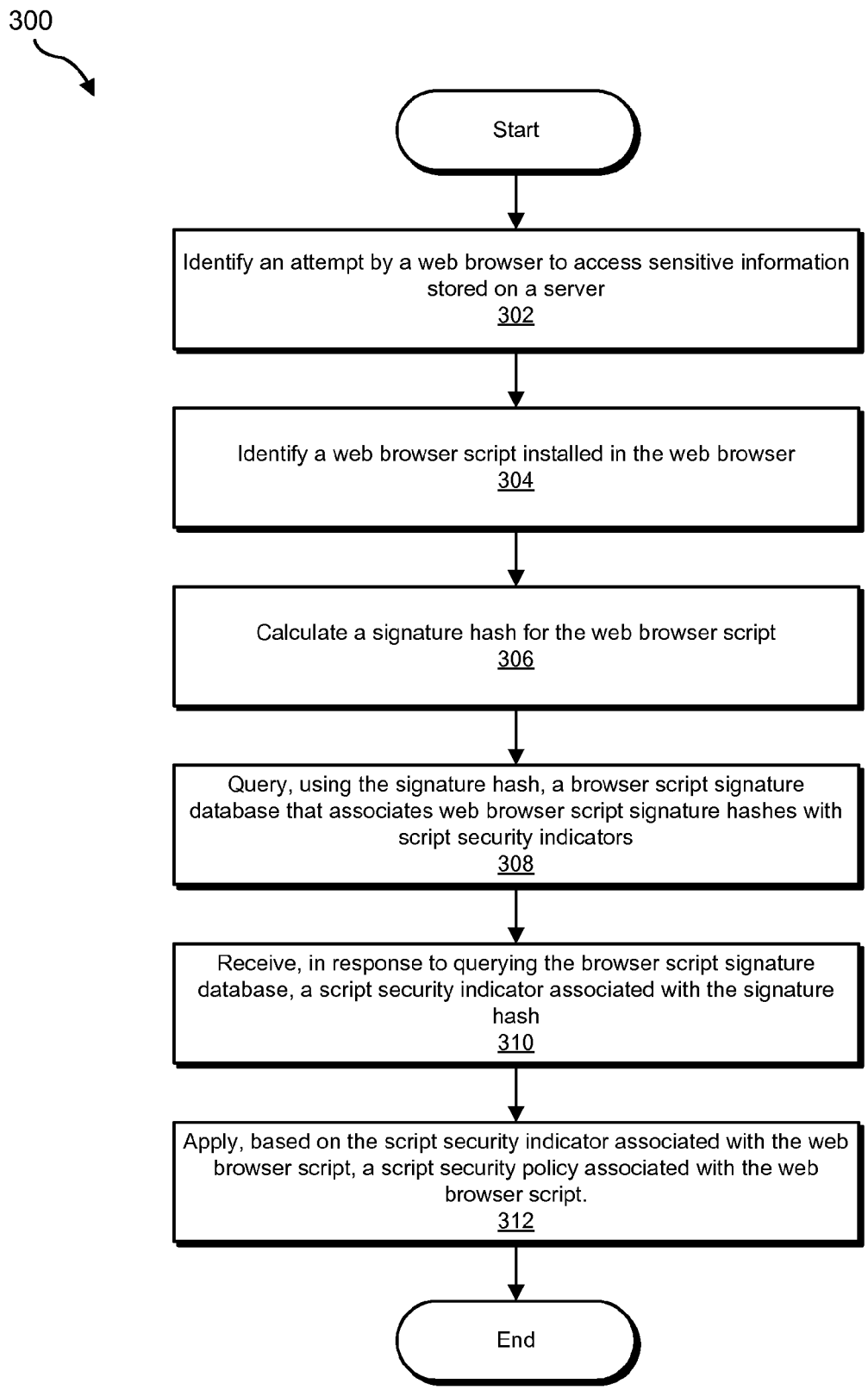
FIG. 3 is a flow diagram of an exemplary method for detecting malicious browser-based scripts.
Figure 4:
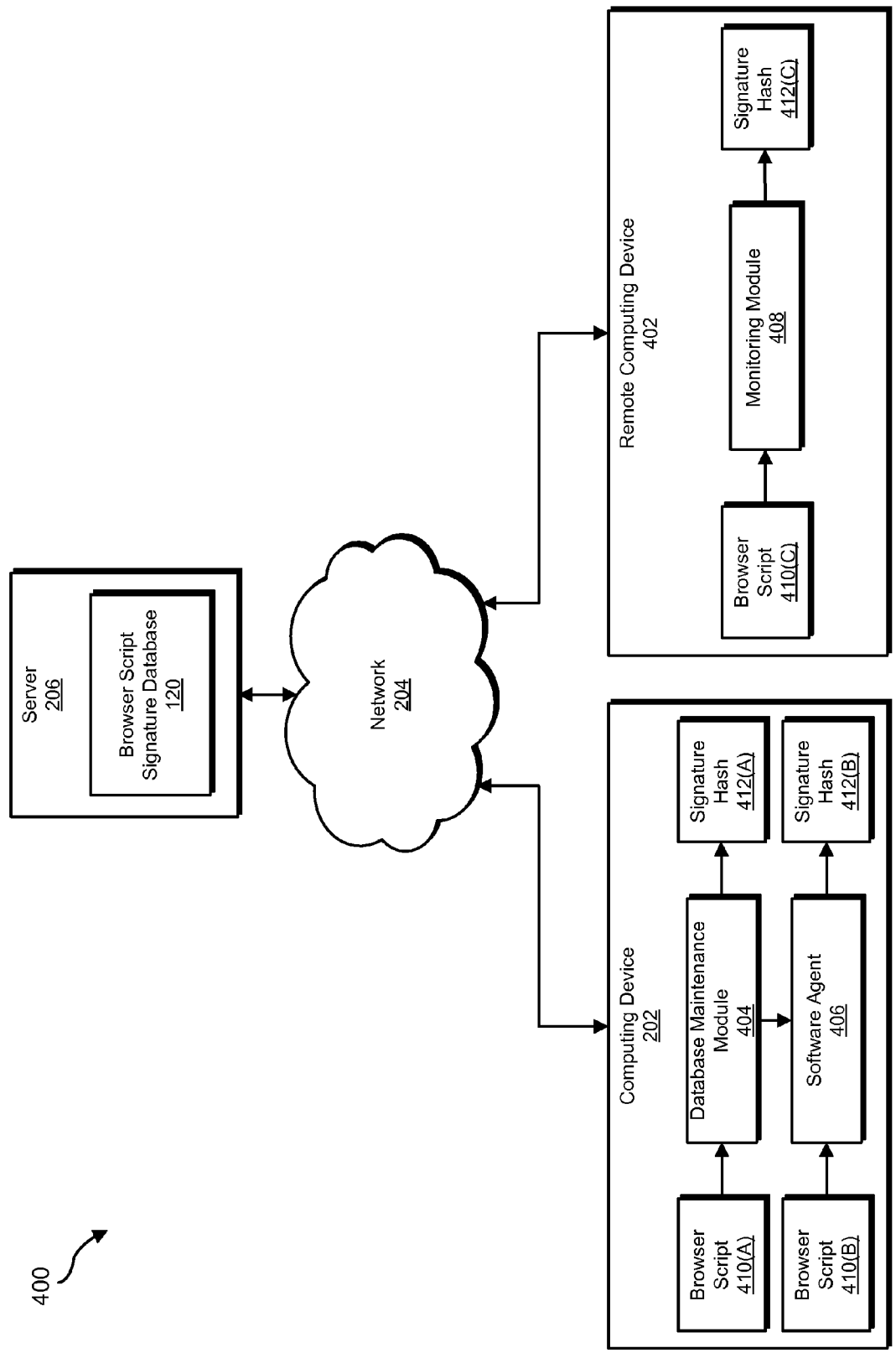
FIG. 4 is a block diagram of an additional exemplary system for detecting malicious browser-based scripts.

The following will provide, with reference to FIGS. 1, 2, and 4 detailed descriptions of exemplary systems for detecting malicious browser-based scripts. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malicious browser-based scripts. As illustrated in this figure, exemplary system 100 may include one or more modules 102 for performing one or more tasks. For example, and as will be explained in greater detail below, exemplary system 100 may include a secure access identification module 104 that may identify an attempt by a web browser to access sensitive information stored on a server. Exemplary system 100 may also include an identification module 106 that may identify a web browser script installed in the web browser. In addition, exemplary system 100 may include a calculation module 108 that may calculate a signature hash for the web browser script.

Exemplary system 100 may also include a query module 110 that may query, using the signature hash, a browser script signature database that associates web browser script signature hashes with script security indicators. Query module 110 may additionally receive, in response to querying the browser script signature database, a script security indicator associated with the signature hash. Exemplary system 100 may also include a script security module 112 that may apply, based on the script security indicator associated with the web browser script, a script security policy associated with the web browser script. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as browser script signature database 120. As will be described in greater detail below, browser script signature database 120 may be configured to store browser script signature hash values and/or script security indicators.

Browser script signature database 120 may represent portions of a single database or computing device or a plurality of databases or computing devices. For example, browser script signature database 120 may represent a portion of server 206 and/or network service 208 in FIG. 2, computing system 510 in FIG. 5, and/or portions of exemplary network architecture 600 in FIG. 6. Alternatively, browser script signature database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 and/or a network service 208 via a network 204. In one embodiment, one or more of modules 102 from FIG. 1 may, when executed by at least one processor of computing device 202, server 206, and/or network service 208, facilitate computing device 202, server 206, and/or network service 208 in detecting malicious browser-based scripts. For example, and as will be described in greater detail below, secure access identification module 104 may be programmed to identify an attempt by a web browser (e.g., a web browser installed on computing device 202) to access sensitive information stored on a network service 208. Identification module 106 may then identify a browser script 214 installed in the web browser. In response, calculation module 108 may calculate a signature hash 216 for the browser script 214. Query module 110 may then query, using the signature hash 216, a browser script signature database 120 (stored, e.g., on server 206) that associates web browser script signature hashes with script security indicators. In response to this query, query module 110 may receive a script security indicator 218 associated with the signature hash 216. Script security module 112 may then apply, based on the script security indicator 218 associated with the browser script 214, a script security policy 220 associated with the browser script 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, server 206, and/or network service 208.

Server 206 generally represents any type or form of computing device that is capable of storing, comparing, and/or providing data. Examples of server 206 include, without limitation, application servers and database servers configured to provide various database services and/or run certain software applications. In one example, server 206 may represent a server owned and/or maintained by a security firm that hosts signature hashes, script security indicators, and/or script security policies for known browser scripts, as detailed below.

Network service 208 generally represents any type or form of computing device that is capable of hosting sensitive information. Examples of network service 208 include, without limitation, web servers, application servers, and database servers configured to provide various database services and/ or run certain software applications. Although illustrated as separate elements, in some examples server 206 and network service 208 may represent portions of the same device and/or may be maintained by the same entity.

FIG. 3 is a flow diagram of an exemplary computer-implemented method 300 for detecting malicious browser-based scripts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an attempt by a web browser to access sensitive information stored on a server. For example, secure access identification module 104 may, as part of computing device 202 in FIG. 2, identify an attempt by a web browser on computing device 202 to access sensitive information stored on network service 208.

The systems described herein may perform step 302 in a variety of ways. In some examples, the systems described herein may identify the attempt by the web browser to access the sensitive information stored on the server by detecting that the web browser is obtaining web data using a secure communications protocol, such as Hypertext Transport Protocol Secure (HTTPS). For example, secure access identification module 104 may detect that, when accessing resources provided by network service 208, the scheme name of the uniform resource identifier (URI) accessed by the browser is "HTTPS."

In other examples, the systems described herein may identify the attempt by the web browser to access the sensitive information stored on the server by detecting that a requested web page contains a request for security credentials. For example, secure access identification module 104 may detect fields for entering a user name and password by parsing Hypertext Markup Language (HTML) or JAVASCRIPT code for a requested web page, or by using a similar "screen scraping" technique. In this example, secure access identification module 104 may determine that these fields implicate an attempt to access sensitive information stored on network service 208.

In some examples, network service 208 may be configured to provide one or more of modules 102 to computing device 202 in response to detecting an attempt by computing device 202 to access sensitive information stored on network service 208. For example, upon receiving a request from computing device 202 to access sensitive information, network service 208 may provide modules 102 to computing device 202 as a prerequisite to computing device 202 gaining access to the requested information. In these examples, the mere receipt and installation of modules 102 by computing device 202 may represent the identification of an attempt by the web browser on computing device 202 to access sensitive information on network service 208.

In another example, the server being accessed by the web browser may be configured to indicate when the web browser attempts to access sensitive information stored on the server. For example, secure access identification module 104 (which may represent a portion of a security software suite installed on computing device 202) may receive an indication from network service 208 that the web browser on computing device 202 is attempting to access sensitive information on network service 208.

At step 304, one or more of the systems described herein may identify a web browser script installed in the web browser that initiated the attempt detected in step 302. For example, identification module 106 may, as part of computing device 202 in FIG. 2, identify a browser script 214 installed in the web browser on computing device 202.

The term "script," as used herein, generally refers to any type or form of computer-executable instructions written for specialized runtime environments that are capable of interpreting and automating the execution of various tasks. Similarly, the phrases "web browser script" and "browser script," as used herein, may refer to scripts, such as JAVASCRIPT, designed to provide extensions to and/or control web browsers.

The systems described herein may perform step 304 in a variety of ways. In some examples, the systems described herein may locate the web browser script by inspecting Document Object Model (DOM) nodes in the web browser. For example, identification module 106 may traverse a DOM tree in the web browser on computing device 202 to identify nodes containing JAVASCRIPT code.

In other examples, the systems described herein may locate the web browser script by inspecting JAVASCRIPT segments in the web browser. For example, identification module 106 may search the browser for all script segments containing the tag 'language="javascript".'

In another embodiment, the systems described herein may identify the web browser script when the web browser script is installed in the web browser. For example, identification module 106 may install an event handler to detect when a web browser script is installed in the browser on computing device 202.

At step 306, one or more of the systems described herein may calculate a signature hash for the web browser script. For example, calculation module 108 may, as part of computing device 202 in FIG. 2, calculate a signature hash 216 for browser script 214.

The phrase "signature hash," as used herein, generally refers to a numeric value or string of characters resulting from performing a procedure or mathematical function on a quantity of data. In some examples, signature hashes can be used to identify malware when a hash function is performed on a unique portion of a malware executable.

The systems descried herein may perform step 306 in a variety of ways. For example, although the phrase "signature hash" may refer to a specific method for identifying malware, the systems described herein may apply any suitable method for identifying malware, including, without limitation, byte signatures, string scanning, wildcard methods, mismatches methods, or bookmark methods. In some examples, calculation module 108 may vary the function used to calculate the signature hash according to a pattern. In other examples, calculation module 108 may select a function to be used to calculate the signature hash at random. Varying the function used to calculate the signature hash may make the operation of calculation module 108 more difficult to predict, and thereby more difficult for a malware designer to subvert.

At step 308, one or more of the systems described herein may query, using the signature hash, a browser script signature database that associates web browser script signature hashes with script security indicators. For example, query module 110 may, as part of computing device 202 in FIG. 2, use signature hash 216 to query browser script signature database 120 stored on server 206.

The phrase "browser script signature database," as used herein, generally refers to a database that facilitates identification of browser scripts based on identifying characteristics of the scripts, such as signature hashes. In one example, this browser script signature database may include signatures of browser scripts known to be safe and/or browser scripts known to be malicious. An indicator of the nature or degree or threat posed by the browser script and/or a security policy to be initiated upon detection of the browser script may also be associated with the signature for each browser script.

The systems described herein may apply any suitable method for querying the browser script signature database. For example, query module 110 may query browser script signature database 120 using a signature hash (e.g., signature hash 216) calculated by calculation module 108. Depending upon the design of browser script signature database 120, query module 110 may query the database using identifying strings, regular expressions, or the like.

The systems described herein also may create and/or maintain browser script signature database 120 a variety of ways. FIG. 4 is a block diagram of an exemplary system 400 capable of performing such a task. As shown in FIG. 4, exemplary system 400 may include a computing device 202 as well as components of exemplary system 200; namely, network 204 and server 206. Exemplary system 400 may also include various components capable of identifying browser scripts 410 and calculating signature hashes 412.

In one example, database maintenance module 406 may create and/or maintain browser script signature database 120 by installing a browser script to be evaluated (e.g., browser script 410(A)) on computing device 202, calculating a signature hash, and then adding the signature hash associated with the browser script (e.g., signature hash 412(A)) to browser script signature database 120. In another example, database maintenance module 404 may deploy a software agent 406 to computing devices (e.g., computing device 202) within a community that locates, downloads, and installs browser scripts (e.g., browser script 410(B)), calculates a signature hash, and then adds the signature hash associated with the browser script (e.g., signature hash 412(B)) to browser script signature database 120.

In another example, the systems described herein may create and/or maintain browser script signature database 120 by including a monitoring module 408 on a remote computing device (e.g., remote computing device 401) that monitors browser scripts (e.g., browser script 410(C)) already installed and/or as they are being installed and adds a signature hash (e.g., signature hash 412(C)) associated with these browser scripts to browser script signature database 120.

Returning to FIG. 3, at step 310 one or more of the systems described herein may receive, in response to querying the browser script signature database, a script security indicator associated with the signature hash. For example, query module 110 may, as part of computing device 202 in FIG. 2, receive a script security indicator 218 associated with signature hash 216 from browser script signature database 120.

The phrase "script security indicator," as used herein, generally refers to an indication of the nature or degree of threat posed by a browser script. In one example, a script security indicator may indicate a threat level with which various security policies may apply. In another example, a script security indicator may specify a particular security policy to be applied.

In addition, the phrase "script security policy," as used herein, generally refers to one or more actions that may be taken in response to determining the nature or degree of threat posed by a browser script. Examples of such actions include, without limitation, permitting a script to be executed, notifying a user or administrator of the existence of a threat, taking action to block the threat, initiating additional analysis of a potential threat, etc.

In one example, the script security indicator received in step 310 may identify the browser script associated with the signature hash. In another example, the script security indicator may indicate the nature or degree of threat posed by the browser script associated with the signature hash. The script security indicator may also specify a security policy to be applied in response to detecting the browser script.

At step 312, one or more of the systems described herein may apply, based on the script security indicator associated with the web browser script, a script security policy associated with the web browser script. For example, script security module 112 may, as part of computing device 202 in FIG. 2, apply a script security policy 220 that is associated with the browser script, as specified by script security indicator 210.

The systems described herein may obtain the script security policy to be applied in a variety of ways. In some examples, the systems described herein may obtain the script security policy by reading the script security policy from the script security indicator and/or a configuration file. In these examples, the configuration file may reside on the computing device or on a remote device, such as server 206. The configuration file may also be part of the browser configuration. In other examples, the systems described herein may obtain the script security policy from the browser script signature database and/or from a local network security policy. The systems described herein may also obtain the script security policy by receiving, via a user interface, a user-generated selection of the script security policy.

The systems and methods described herein may apply the script security policy in any suitable manner. Examples of actions that script security module 112 may perform by applying script security policy 220 include, without limitation, initiating additional analysis of browser script 214, notifying a user or administrator of a threat posed by browser script 214 (by, e.g., displaying a message informing the user or administrator of the application of script security policy 220), notifying network service 208 of a threat posed by browser script 214, blocking execution of browser script 214, blocking the web browser on computing device 202 from accessing sensitive information stored on network service 208, blocking the network access of computing device 202 altogether, disabling browser script 214 and/or computing device 202, and/or performing any other suitable action.

In other examples, if the script security indicator indicates that the browser script is safe and/or does not pose a threat, then the systems describe herein may permit the web browser to access the sensitive information stored on the server. For example, if script security indicator 218 indicates that browser script 214 does not pose a threat to the sensitive information requested from network service 208, then script security module 112 may allow the web browser on computing device 202 to retrieve this sensitive information from network service 208.

As explained above in connection with exemplary method 300, the systems and methods described herein may provide the ability to protect sensitive information on a web server from being intercepted by malicious browser scripts and/or cross-site scripting flaws. For example, by comparing the characteristics of each script installed on a requesting client device with entries in a database of known web browser scripts, the systems and methods described herein may detect the presence of potentially malicious browser scripts prior to granting the client device access to sensitive information. When malicious browser scripts are identified, an appropriate security policy may then be applied.

Because the systems and methods described herein may be implemented as a browser extension or other client-based software, this may avoid placing additional processing or bandwidth demands on the web server providing the sensitive information. In addition, the actions of browser scripts identified as safe may not be affected or otherwise limited.

Figure 5:
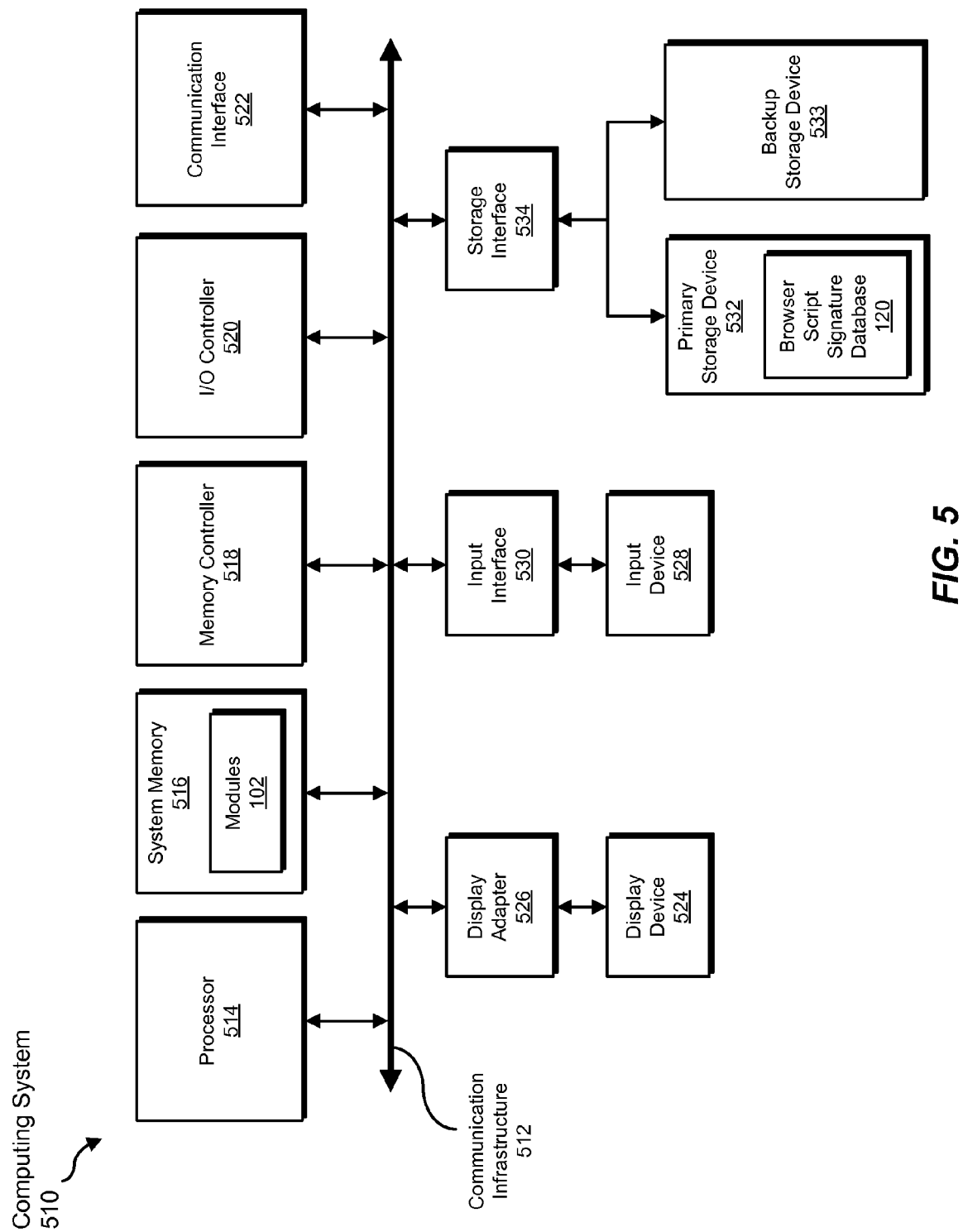
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet.

Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, browser script signature database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
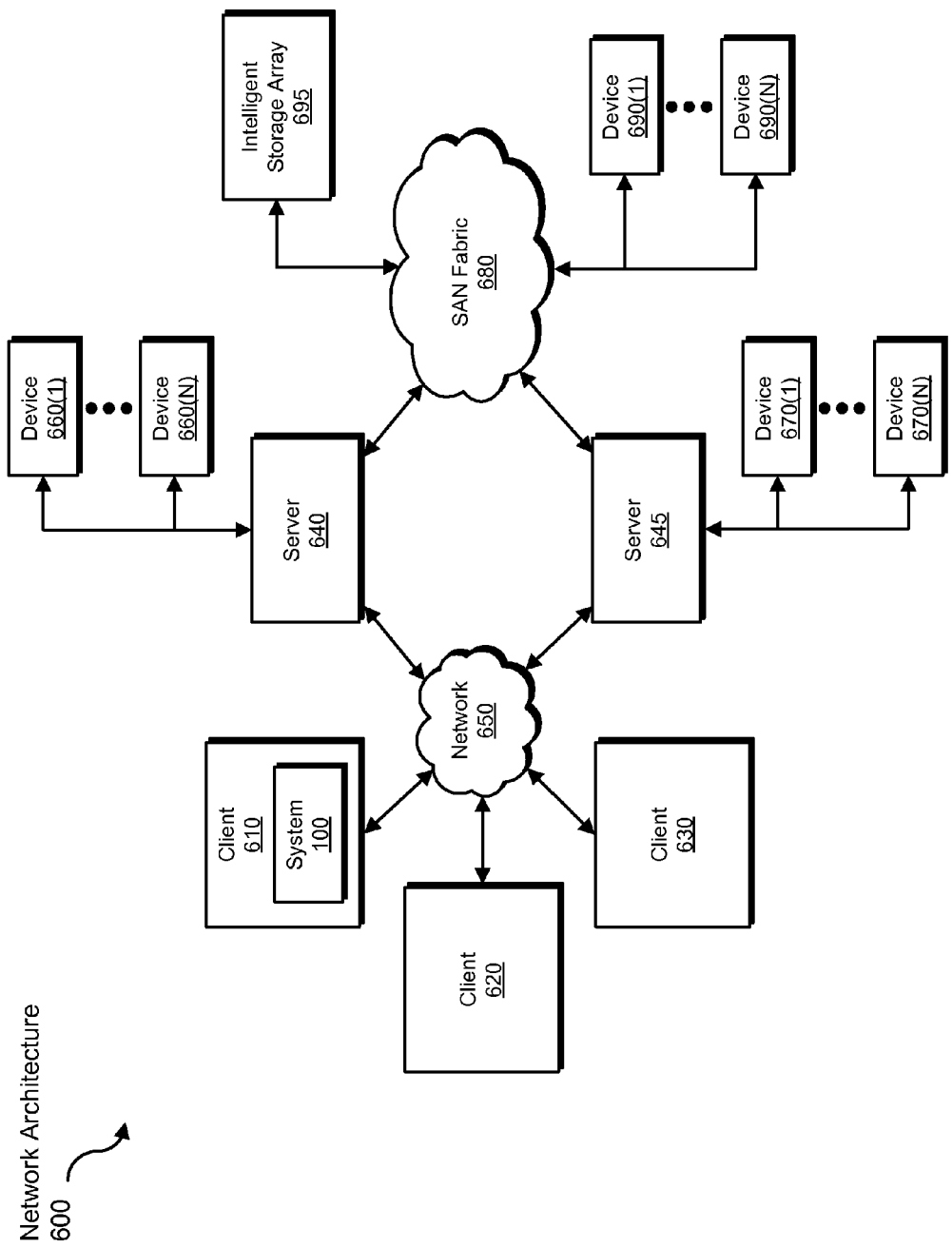
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malicious browser-based scripts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment, such as a client or server-side virtualization environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer (such as an application layer for a web browser and/or a web browser component, such as a browser's script interpreter) that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/ or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for detecting malicious scripts in a web browser. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious browser-based scripts, the method comprising:
   identifying an attempt by a web browser to access sensitive information stored on a server;
   locating a web browser script installed in the web browser by inspecting Document Object Model nodes in the web browser prior to determining whether to allow the web browser to access the sensitive information;
   calculating a signature hash for the web browser script;
   querying, using the signature hash, a browser script signature database that associates web browser script signature hashes with script security indicators;
   receiving, in response to querying the browser script signature database, a script security indicator associated with the signature hash, the script security indicator indicating whether the web browser script is identified, within the browser script signature database, as a security threat;
   applying, based on the script security indicator that indicates whether the web browser script is identified as a security threat, a script security policy associated with the web browser script, the script security policy indicating whether to allow the web browser to access the sensitive information stored on the server;
   wherein a computing device comprising at least one processor performs the method.

2. The method of claim 1, wherein identifying the attempt by the web browser to access the sensitive information stored on the server comprises at least one of:
   detecting that the web browser is obtaining web data using hypertext transport protocol secure;
   detecting that a web page contains a request for security credentials;
   receiving, from the server, an indication that the web browser is attempting to access sensitive information.

3. The method of claim 1, wherein locating the web browser script installed in the web browser comprises at least one of:

locating the web browser script by inspecting JAVAS-CRIPT segments in the web browser;

identifying the web browser script when the web browser script is installed in the web browser.

4. The method of claim 1, further comprising obtaining the script security policy by at least one of:

reading the script security policy from a configuration file;

obtaining the script security policy from the browser script signature database;

obtaining the script security policy from a local network security policy;

receiving, via a user interface, a user-generated selection of the script security policy.

5. The method of claim 1, wherein applying the script security policy comprises at least one of:

displaying a message informing a user of the script security policy;

permitting the web browser to access the sensitive information stored on the server;

blocking access by the web browser to the sensitive information stored on the server;

blocking network access by the computing device;

disabling the web browser script.

6. The method of claim 1, further comprising maintaining the browser script signature database.

7. The method of claim 6, wherein maintaining the browser script signature database comprises:

installing the web browser script;

calculating the signature hash for the web browser script;

adding the signature hash to the browser script signature database.

8. The method of claim 6, wherein maintaining the browser script signature database comprises:

deploying a software agent that locates, downloads, and installs the web browser script;

calculating the signature hash for the web browser script;

adding the signature hash to the browser script signature database.

9. The method of claim 6, wherein maintaining the browser script signature database comprises:

providing a monitoring module to web browsers that identifies the web browser script;

receiving, from the monitoring module, the signature hash for the web browser script;

adding the signature hash to the browser script signature database.

10. A system for detecting malicious browser-based scripts, the system comprising:

a secure access identification module that identifies an attempt by a web browser to access sensitive information stored on a server;

an identification module that locates a web browser script installed in the web browser by inspecting Document Object Model nodes in the web browser prior to determining whether to allow the web browser to access the sensitive information;

a calculation module that calculates a signature hash for the web browser script;

a query module that:

queries, using the signature hash, a browser script signature database that associates web browser script signature hashes with script security indicators;

receives, in response to querying the browser script signature database, a script security indicator associated with the signature hash, the script security indicator indicating whether the web browser script is identified, within the browser script signature database, as a security threat;

a script security module that applies, based on the script security indicator that indicates whether the web browser script is identified as a security threat, a script security policy associated with the web browser script, the script security policy indicating whether to allow the web browser to access the sensitive information stored on the server;

at least one processor that executes the secure access identification module, the identification module, the calculation module, the query module, and the script security module.

11. The system of claim 10, wherein the secure access identification module identifies the attempt by the web browser to access the sensitive information stored on the server by at least one of:

detecting that the web browser is obtaining web data using hypertext transport protocol secure;

detecting that a web page contains a request for security credentials;

receiving, from the server, an indication that the web browser is attempting to access sensitive information.

12. The system of claim 10, wherein the identification module locates the web browser script installed in the web browser by at least one of:

locating the web browser script by inspecting JAVAS-CRIPT segments in the web browser;

identifying the web browser script when the web browser script is installed in the web browser.

13. The system of claim 10, wherein the script security module obtains the script security policy by at least one of:

reading the script security policy from a configuration file;

obtaining the script security policy from the browser script signature database;

obtaining the script security policy from a local network security policy;

receiving, via a user interface, a user-generated selection of the script security policy.

14. The system of claim 10, wherein the script security module applies the script security policy by at least one of:

displaying a message informing a user of the script security policy;

permitting the web browser to access the sensitive information stored on the server;

blocking access by the web browser to the sensitive information stored on the server;

blocking network access;

disabling the web browser script.

15. The system of claim 10, further comprising a database maintenance module that maintains the browser script signature database.

16. The system of claim 15, wherein the database maintenance module maintains the browser script signature database by:

installing the web browser script;

calculating the signature hash for the web browser script;

adding the signature hash to the browser script signature database.

17. The system of claim 15, wherein the database maintenance module maintains the browser script signature database by:

deploying a software agent that locates, downloads, and installs the web browser script;

calculating the signature hash for the web browser script;

adding the signature hash to the browser script signature database.

18. The system of claim 15, wherein the database maintenance module maintains the browser script signature database by:
providing a monitoring module to web browsers that identifies the web browser script;
receiving, from the monitoring module, the signature hash for the web browser script;
adding the signature hash to the browser script signature database.

19. A non-transitory computer-readable medium comprising one or more computer-executable instructions that, when executed by at least one processor of a computing device, cause the computing device to:
identify an attempt by a web browser to access sensitive information stored on a server;
locate a web browser script installed in the web browser by inspecting Document Object Model nodes in the web browser prior to determining whether to allow the web browser to access the sensitive information;
calculate a signature hash for the web browser script;
query, using the signature hash, a browser script signature database that associates web browser script signature hashes with script security indicators;
receive, in response to querying the browser script signature database, a script security indicator associated with the signature hash, the script security indicator indicating whether the web browser script is identified, within the browser script signature database, as a security threat;
apply, based on the script security indicator that indicates whether the web browser script is identified as a security threat, a script security policy associated with the web browser script, the script security policy indicating whether to allow the web browser to access the sensitive information stored on the server.

20. The non-transitory computer-readable medium of claim 19, further comprising one or more computer-executable instructions that, when executed by at least one processor of the computing device, cause the computing device to maintain the browser script signature database.

* * * * *